(12) United States Patent
Su et al.

(10) Patent No.: US 7,525,963 B2
(45) Date of Patent: Apr. 28, 2009

(54) BRIDGING SUBNET BROADCASTS ACROSS SUBNET BOUNDARIES

(75) Inventors: Philip Ti-Fei Su, Redmond, WA (US); Robert J. Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 10/421,705

(22) Filed: Apr. 24, 2003

(65) Prior Publication Data

US 2004/0213270 A1  Oct. 28, 2004

(51) Int. Cl.
*H04L 12/28* (2006.01)
(52) U.S. Cl. .................................. 370/390; 370/401
(58) Field of Classification Search ................. 370/389, 370/390, 392, 401
See application file for complete search history.

(56) References Cited

U.S. PATENT DOCUMENTS

| | | | | |
|---|---|---|---|---|
| 4,347,498 | A * | 8/1982 | Lee et al. ............... | 340/825.02 |
| 5,327,426 | A | 7/1994 | Dolin, Jr. et al. | |
| 5,740,375 | A * | 4/1998 | Dunne et al. ............. | 709/238 |
| 6,208,649 | B1 * | 3/2001 | Kloth ..................... | 370/392 |
| 6,304,898 | B1 | 10/2001 | Shiigi | |
| 6,470,013 | B1 * | 10/2002 | Barach et al. ............. | 370/392 |
| 6,556,541 | B1 * | 4/2003 | Bare ....................... | 370/235 |
| 6,564,249 | B2 | 5/2003 | Shiigi | |
| 6,606,315 | B1 * | 8/2003 | Albert et al. ............. | 370/352 |
| 6,954,459 | B1 * | 10/2005 | Vaidhyanathan et al. ... | 370/392 |
| 2001/0005369 | A1 * | 6/2001 | Kloth ..................... | 370/392 |
| 2001/0030785 | A1 * | 10/2001 | Pangrac et al. ............ | 359/125 |
| 2002/0042706 | A1 * | 4/2002 | Rodriguez ................ | 703/22 |
| 2002/0161879 | A1 * | 10/2002 | Richard .................. | 709/223 |
| 2003/0018814 | A1 * | 1/2003 | Kao et al. ................ | 709/245 |
| 2003/0195976 | A1 | 10/2003 | Shiigi | |
| 2004/0208189 | A1 * | 10/2004 | Fukuda .................... | 370/401 |

OTHER PUBLICATIONS

J. Postel, "User Datagram Protocol—RRC 768", IETF, Request for Comment, RFC, XP002080689, Aug. 28, 1980.
European Search Report dated Mar. 4, 2005.

* cited by examiner

*Primary Examiner*—Hong Cho
(74) *Attorney, Agent, or Firm*—Amin,Turocy & Calvin, LLP

(57) ABSTRACT

Methods for bridging subnet broadcasts across subnet boundaries include: (a) receiving a first broadcast message that originates in a first subnet; (b) sending the first broadcast message to a second subnet; and (c) broadcasting the first broadcast message on the second subnet, wherein the first broadcast message is not sent from the second subnet back to the first subnet and/or it is not rebroadcast on the first subnet. Other methods of processing broadcast messages include: (a) receiving a first broadcast message on a first subnet; (b) determining whether the first broadcast message originated in the first subnet; and (c) when the first broadcast message originated in the first subnet, sending the first broadcast message to a second subnet. Such methods may further include, at least in some examples, marking the first broadcast message to indicate that it originated from the first subnet. Example systems for performing various bridging methods, including the bridging methods described above, may include, for example: (a) a receiver adapted to receive a first broadcast message, wherein the first broadcast message originates in a first subnet; (b) a repeater adapted to send the first broadcast message to a second subnet; and (c) a replicator adapted to broadcast a second broadcast message originating from a subnet other than the first subnet on the first subnet. All subnets involved in the communication may include this type of structure to enable cross communication of broadcast message data between the subnets.

24 Claims, 8 Drawing Sheets

BRIDGING SUBNET BROADCASTS ACROSS SUBNET BOUNDARIES

FIELD OF THE INVENTION

The present invention generally relates to systems and methods for bridging subnet broadcasts, including subnet broadcast messages, across subnet boundaries for broadcast on other independent subnets.

BACKGROUND

Electronic communications are becoming increasingly critical to operating in the modern world. More and more, both personal and business relationships depend on rapid, reliable, seamless, and instantaneous communications between numerous parties. The ability to audibly and/or visibly communicate simultaneously with several other parties at multiple locations is no longer viewed as a convenience or a luxury in many industries; it is a vital necessity.

Many electronic communications involve communications between parties using computer terminal workstations or other communication devices. A wide variety of methods can be used for such communications. For communications between users on a single "subnet" (a group of machines in communication with one another under a single router or bridge device), communications can take place using the router or bridge device, a common server, if available, in a peer-to-peer manner, or in any other suitable manner. For communications between users on different, independent subnets, generally the Internet or some other communication medium or network must be used.

Various communication protocols may be used for sending data messages to other users, both in "intra-subnet" communications (communications between users in a single subnet) and "inter-subnet" communications (communications between users on different subnets). One such protocol is called the "transmission control protocol" or "TCP." TCP allows data communications between machines located on the same or different subnets. One advantage of TCP is that it will guarantee complete and in order delivery of data packets in the data message. Thus, TCP typically is a protocol of choice when delivering lengthy messages from machine to machine, particularly when message "in order" delivery is an important factor.

Not all data messages, however, require the added reliability and "in order" delivery aspects of TCP communications. For example, another communication protocol is called the "user datagram protocol" or "UDP." UDP allows message delivery in various ways, such as via broadcast to multiple machines; via transmission to a specific machine, either to a specific machine within the same subnet as the machine generating the UDP message or to a specific machine on a different subnet; and the like. While UDP will make its best efforts at data message delivery, this protocol does not guarantee delivery. For example, if a data message is too long for the protocol operating on a given system, the message will simply be dropped and remain undelivered.

UDP messages can be very useful in situations where delivery of every data packet is not critical. For example, UDP often is used to send time data to machines on a given subnet. Delivery of every time data packet to every machine on a subnet is not critical because even if a machine does not receive a given time packet or two, another one will follow shortly, which will allow the machine to resynchronize back onto the correct system time (assuming its time drifted somewhat between received time data packets).

One advantage of use of UDP for data message delivery relates to UDP's ability to broadcast messages to all machines on a subnet. For example, UDP delivery of time data packets as described above can be accomplished via broadcast to all users on the subnet. This type of UDP broadcasting ability, however, is limited to broadcast to users on a single subnet (generally allowing any user to send UDP broadcasts to all users over multiple subnets or an Internet connected system would rapidly clog the subnets or Internet with broadcast message data). Such broadcasting of message data is advantageous because, as users enter and leave a communication group on the subnet, each will receive the broadcasted messages without the need to maintain, update, and edit a data message recipient list. TCP does not support this type of broadcast messaging ability (rather, each TCP message must specify one or more intended recipients).

As noted above, broadcasting across subnet boundaries is not allowed, because such broadcast communications (e.g., to all machines on a communication network) would quickly overwhelm the bandwidth and resources of the communication network. UDP "multicasting," however, does exist. Multicasting allows UDP message packets to be sent to a plurality of specified recipients, even when one or more of the recipients are located on a different subnet from the message originating subnet. This multicasting system is disadvantageous, however, as compared to broadcast messages because the desired recipients of each message must be indicated in each message data sent. Additionally, for multicasting to work, all routers being used in the communication network for the group communicating must support multicasting. Unfortunately, not all routers support this multicasting feature. Therefore, delivery of any multicasted messages cannot be guaranteed to all intended recipients.

Accordingly, there is a need in the art for reliable systems and methods that enable bridging broadcast message communications across subnet boundaries without unduly clogging the communications network while still providing reliable data communications to all available participants in a communicating group.

SUMMARY

Aspects of the present invention relate to methods for bridging subnet broadcasts across subnet boundaries that include: (a) receiving a first broadcast message that originates in a first subnet; (b) sending the first broadcast message to a second subnet; and (c) broadcasting the first broadcast message on the second subnet, wherein the first broadcast message is not sent from the second subnet back to the first subnet and/or it is not rebroadcast on the first subnet. Another aspect of the invention relates to methods of processing broadcast messages that include: (a) receiving a first broadcast message on a first subnet; (b) determining whether the first broadcast message originated in the first subnet; and (c) when the first broadcast message originated in the first subnet, sending the first broadcast message to a second subnet. Such methods may further include, at least in some examples, marking the first broadcast message to indicate that it originated from the first subnet. The first broadcast message also may be sent to and broadcast on additional, independent subnets while still not being sent from these additional subnets back to the first subnet. The messages may be sent from the first subnet to the other subnets using any suitable protocol, such as TCP or UDP, and they may be broadcast on these other subnets using any suitable broadcast protocol, including UDP.

Additional aspects of the invention relate to systems for performing various bridging methods, including the bridging methods described above. Such systems may include, for example: (a) a receiver adapted to receive a first broadcast message, wherein the first broadcast message originates in a first subnet; (b) a repeater adapted to send the first broadcast message to a second subnet; and (c) a replicator adapted to broadcast a second broadcast message originating from a subnet other than the first subnet on the first subnet. All subnets involved in the communication may include this type of bridging structure to enable cross communication of broadcast message data between the subnets.

BRIEF DESCRIPTION OF THE DRAWINGS

The above and other objects, features, and advantages of the present invention will be readily apparent and fully understood from the following detailed description, taken in connection with the appended drawings, in which.

DETAILED DESCRIPTION

Figure 1:
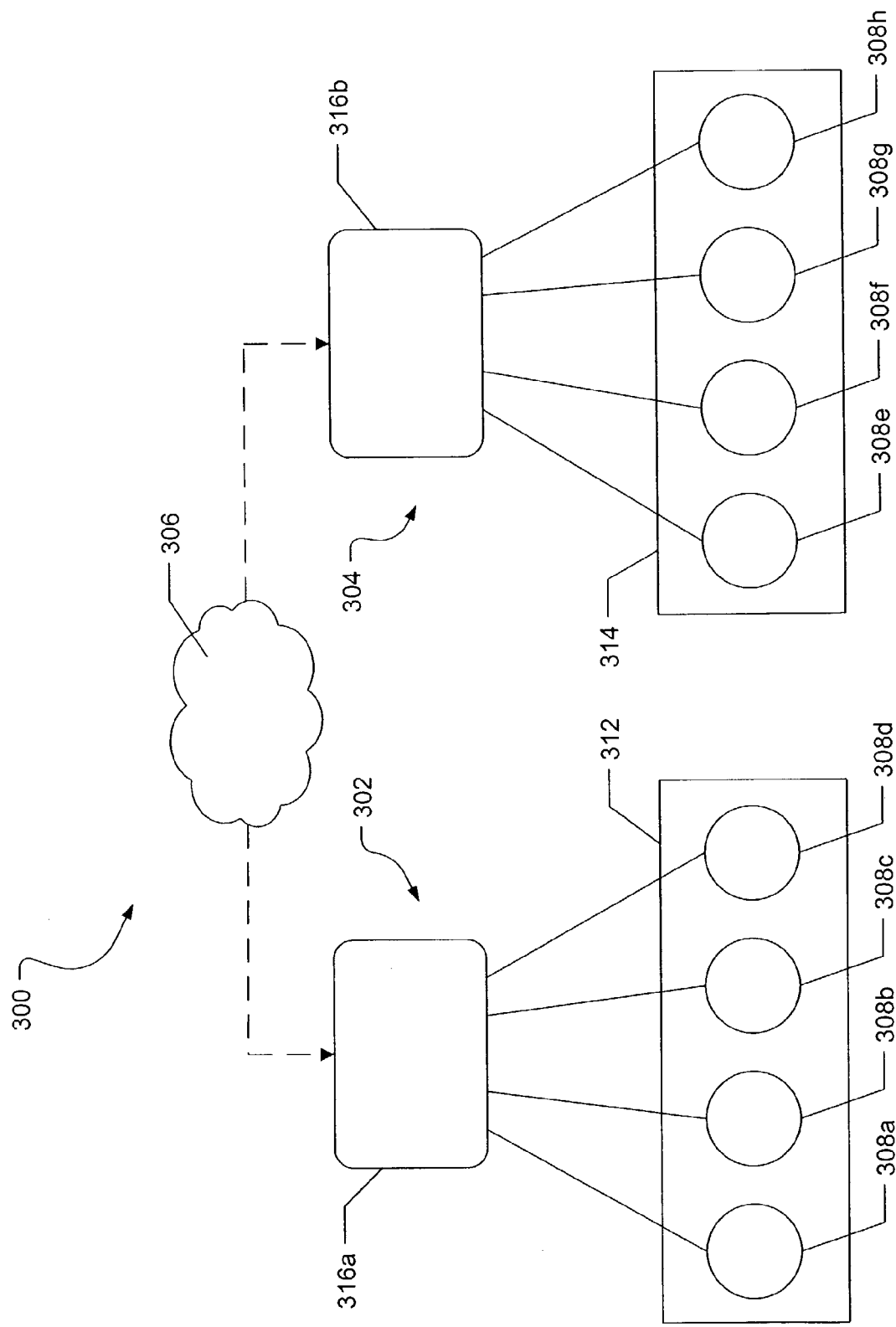
FIG. 1 illustrates two subnets in communication with one another over a communication network, as may be used in systems and methods according to some examples of the present invention.

As described above, aspects of the present invention relate to systems and methods for bridging subnet broadcasts across subnet boundaries for broadcast on other independent subnets. The following description is divided into sub-sections to assist the reader. The sub-sections include: Terms; Bridging Systems and Methods in General; Example Bridging Systems and Methods According to the Invention; Example Hardware; and Conclusion.

I. Terms

The following terms are used in this specification and have the meanings described below, unless another meaning is provided and/or clear from the context:

"Bridge" means a system for transmitting broadcast messages originating in one subnet across a communication network to another subnet for rebroadcast on that subnet. A "bridge" may be comprised of hardware, software, and/or a combination thereof.

"Broadcast" means transmission of a data message to all machines on a specific subnet (there is no requirement that a machine make use of the broadcasted data, i.e., the data may be ignored by one or more machines on the subnet).

"Subnet" means all machines in communication with one another under a single router or bridge device. Typically, conventional hubs and routers used for inter-machine communications directly connect machines located on the same subnet such that machines located on a single subnet need not communicate with one another over a global communication network such as the Internet. Additionally, machines on a single subnet may communicate with one another in a peer-to-peer manner.

"Message," "message data," or "data message" means any data transmitted from one machine for receipt by any other machine.

"Machine" means any device used in communicating over a communication network. A "machine" includes, but is not necessarily limited to: a computer terminal or workstation, desktop PCs, pen or stylus-based PCs, notebook and/or laptop computers, palmtops, PDAs, telephones, and the like.

"Marked" or "marking" or "mark" means in some way enabling systems or methods according to the invention to identify and/or determine: (a) whether a message originated on a given subnet, (b) whether a message did not originate on a given subnet, and/or (c) the originating subnet of a message. This term should be construed broadly to include, but is not necessarily limited to, at least one of the following: (a) encoding a message with data indicating its IP address of origin, (b) encoding a message with data indicating a transmission port associated with the message, (c) encoding a message with data indicating an IP address of any hardware or machine handling the message during its transmission, (d) encoding a message with data indicating an input port or an output port associated with any hardware or machine handling the message during its transmission, (e) setting a flag associated with the message, (f) encoding a message with data indicating that the message has been previously broadcast on a subnet, (g) encoding a message with data indicating that the message has been transmitted across a communication network, (h) encoding a message with data indicating that the message has not been previously broadcast on another subnet, (i) encoding a message with data indicating that the message has not been transmitted across a communication network, and the like.

"Listener" or "receiver" means a device, combination of devices, or a system that detects and/or identifies broadcast messages on a subnet. These terms are used interchangeably in this specification. Functions of a listener or receiver may be performed in hardware, in software, and/or in a combination of hardware and software. Additionally, a listener or receiver may perform functions in addition to those specified above.

"Repeater" means a device, combination of devices, or a system that transmits a message from one machine to another machine located on a different subnet (e.g., over a communication network). Functions of a repeater may be performed in hardware, in software, and/or in a combination of hardware and software. Additionally, a repeater may perform functions in addition to those specified above.

"Replicator" means a device, a combination of devices, or a system that receives a message transmitted across a communication network and broadcasts it to another subnet (e.g., the subnet in which it is located). Functions of a replicator may be performed in hardware, in software, and/or in a combination of hardware and software. Additionally, a replicator may perform functions in addition to those specified above.

In some examples of this invention, functions of the listener, repeater, and/or replicator may be combined in one or more devices. One example of such a device capable of performing the functions of a listener, repeater, and replicator is a Cisco Aironet 350, available from Cisco Systems, Inc.

II. Bridging Systems and Methods in General

Examples of the present invention relate generally to systems and methods for transmitting subnet broadcast messages across subnet boundaries for broadcast on another subnet. One more specific example aspect of this invention relates to systems for bridging subnet broadcasts across subnet boundaries that include: a receiver adapted to receive a first broadcast message, wherein the first broadcast message originates in a first subnet; a repeater adapted to send the first broadcast message to a second subnet; and a replicator adapted to broadcast a second broadcast message originating from a subnet other than the first subnet on the first subnet. In at least some examples of the invention, the repeater will not send the second broadcast message back to its originating subnet.

Another example aspect of this invention relates to bridging systems for bridging subnet broadcasts between a first subnet and a second subnet. Example bridging systems of this type may include: a first receiver adapted to receive a first broadcast message that originates in the first subnet; a second receiver adapted to receive a second broadcast message that originates in the second subnet; a first repeater adapted to send the first broadcast message to the second subnet; a second repeater adapted to send the second broadcast message to the first subnet; a first replicator adapted to broadcast the second broadcast message on the first subnet; and a second replicator adapted to broadcast the first broadcast message on the second subnet. In at least some examples of this aspect of the invention, the first repeater will not send the second broadcast message to the second subnet, and the second repeater will not send the first broadcast message to the first subnet. Additionally, in some examples, the first receiver, the first repeater, and the first replicator will form a first bridge member, and the second receiver, the second repeater, and the second replicator will form a second bridge member that is in communication with the first bridge member. In some examples, the functions of the first and second listeners may be performed by a single device or set of devices, the functions of the first and second repeaters may be performed by a single device or set of devices, and the functions of the first and second replicators may be performed by a single device or set of devices.

The example systems described above may include further equipment useful in practicing the invention. For example, the systems may include ports for receiving and/or transmitting the various messages. Additionally, in at least some examples, at least some of the transmitted messages are user datagram protocol ("UDP") broadcast messages.

Aspects of the invention also relate to methods for bridging subnet broadcasts across subnet boundaries. One example method according to this aspect of the invention includes: receiving a first broadcast message that originates in a first subnet; sending the first broadcast message to a second subnet; and broadcasting the first broadcast message on the second subnet, wherein the first broadcast message (a) is not sent from the second subnet back to the first subnet and/or (b) is not rebroadcast on the first subnet. In at least some examples, the broadcast message may be marked in some suitable manner to indicate that it originated from the first subnet and/or to indicate that it did not originate in the second subnet. This type of marking may be used by systems and methods according to some examples of the invention as an aid to assist in preventing sending messages back to their originating subnet. Again, in at least some examples of this aspect of the invention, at least some of the broadcast messages may be UDP broadcast messages.

Additional aspects of methods according to the invention may, in at least some examples, further include: sending the first broadcast message to a third subnet; and broadcasting the first broadcast message on the third subnet, wherein the first broadcast message: (a) is not sent from the third subnet back to the first subnet and/or (b) is not otherwise rebroadcast on the first subnet. The first broadcast message may be sent to the third subnet from either the first subnet or the second subnet, without departing from the invention. As with the other examples described above, if desired, when the first broadcast message is broadcasted on the third subnet, it may be marked to indicate that it did not originate on the third subnet and/or to indicate that it originated on the first subnet.

Another example aspect of the invention relates to another method of bridging subnet broadcasts across subnet boundaries. This example method includes: receiving a first broadcast message that originates in a first subnet; receiving a second broadcast message that originates in a second subnet; sending the first broadcast message to the second subnet; sending the second broadcast message to the first subnet; broadcasting the first broadcast message on the second subnet, wherein the first broadcast message (a) is not sent from the second subnet back to the first subnet and/or (b) is not rebroadcast on the first subnet; and broadcasting the second broadcast message on the first subnet, wherein the second broadcast message (a) is not sent from the first subnet back to the second subnet and/or (b) is not rebroadcast on the second subnet. As with other examples described above, the broadcast messages may be marked, in at least some examples of this aspect of the invention, to indicate the broadcast messages' subnet of origin and/or to indicate that the broadcast message did not originate on the subnet of their rebroadcast.

Still another aspect of this invention relates to methods of processing broadcast messages. Such methods may include: receiving a first broadcast message on a first subnet; determining whether the first broadcast message originated in the first subnet; and when the first broadcast message originated in the first subnet, sending the first broadcast message to a second subnet. The first broadcast message then may be broadcast over the second subnet. In some examples, the first broadcast message is sent to a predetermined port of a device in the second subnet. In a similar manner, a second broadcast message may be sent from the second subnet to the first subnet and broadcast over the first subnet, in at least some examples of this aspect of the invention.

In the various example systems and methods according to the invention described above, the origin of the broadcast messages may be marked, noted, or tracked in any suitable manner without departing from the invention. For example, determining whether a broadcast message originated in a specific subnet may include determining at least one of an originating IP address on the subnet of a device initially transmitting or receiving the broadcast message or an originating port number on the subnet of the device transmitting or receiving the broadcast message. This type of information may be tracked with respect to any device handling the message during the bridging procedure. These and other more specific features and aspects of the invention are described in more detail, with reference to FIGS. 1-10, below.

III. Example Bridging Systems and Methods According to the Invention

FIG. 1 illustrates a simplified schematic diagram of a system 300 that may implement various examples of bridging systems and methods according to this invention. The system 300 may include at least two independent subnet systems 302 and 304 linked together via any suitable communication medium or network 306, such as the Internet. The two subnet systems 302 and 304 may communicate in any suitable manner without departing from the present invention, including conventional manners well known to those skilled in the art.

A subnet 302 or 304 may include two or more machines 308a-308h connected to a common router 316a and 316b. Any suitable machines may be joined together for communication on a subnet, including, but not limited to, computer terminals or workstations, desktop PCs, pen or stylus-based PCs, notebook and/or laptop computers, palmtops, PDAs, telephones, and the like. In FIG. 1, the individual machines 308a-308d under subnet 302 are enclosed in box 312 to illustrate the machines in one subnet 302, and the individual machines 308e-308h under subnet 304 are enclosed in box 314 to illustrate the machines in this second subnet 304. Of course, any desired or suitable number of machines may be included in an individual subnet without departing from the present invention. Additionally, these machines may be connected into the subnet in any suitable manner, including wired connections, wireless connections, and any conventional manners well known to those skilled in the art.

Machines 308a through 308d within subnet 302 can communicate with one another (e.g., send data messages) without those communications transmitting external to the subnet 302, e.g., they can communicate through the router or bridge member 316a without the communications going out over the communication network 306 and/or they can communicate directly with one another, e.g., in a peer-to-peer manner, using a crossover cable, etc. (for clarity, direct communication connections between machines 308a-308d are not illustrated in FIG. 2). Moreover, broadcast type messages (such as UDP broadcast messages) can be transmitted to all machines of a single subnet 302. Such broadcast type messages can originate from any one of the individual machines 308a-308d on the subnet 302, from a server (e.g., an application server or file server as conventionally used), from the router 316a, or from any other suitable source on the subnet 302. These broadcast messages (and particularly UDP broadcast messages), however, must stay within the subnet 302; they cannot be broadcasted to all users over the communication network 306. Similarly, broadcast messages originating in subnet 304 may be communicated to all machines 308e-308h within subnet 304.

Message data also may be communicated from one subnet 302 to the other subnet 304 (and vice versa) over the communication network 306, such as the Internet. Each subnet 302 and 304 includes a bridging member or router 316a and 316b that enables communications between subnets 302 and 304 over the communication network 306. As an example, when machine 308a in subnet 302 wants to send message data to machine 308h in subnet 304, machine 308a sends a data message (in one or more packets) through router 316a, over the communication network 306, to router 316b of subnet 304, which then direct the message data to machine 308h. The message data is marked to include the intended recipient(s) of the message data (e.g., a destination IP address or port associated with machine 308h), and the various servers and/or routers use this marking information to correctly direct the message data. Message data of this type can be sent using any suitable type of communication protocol, including, but not necessarily limited to, UDP and TCP. Directed communication over a communication network 306 of this type is conventional and well understood by those of skill in the art.

Figure 2:
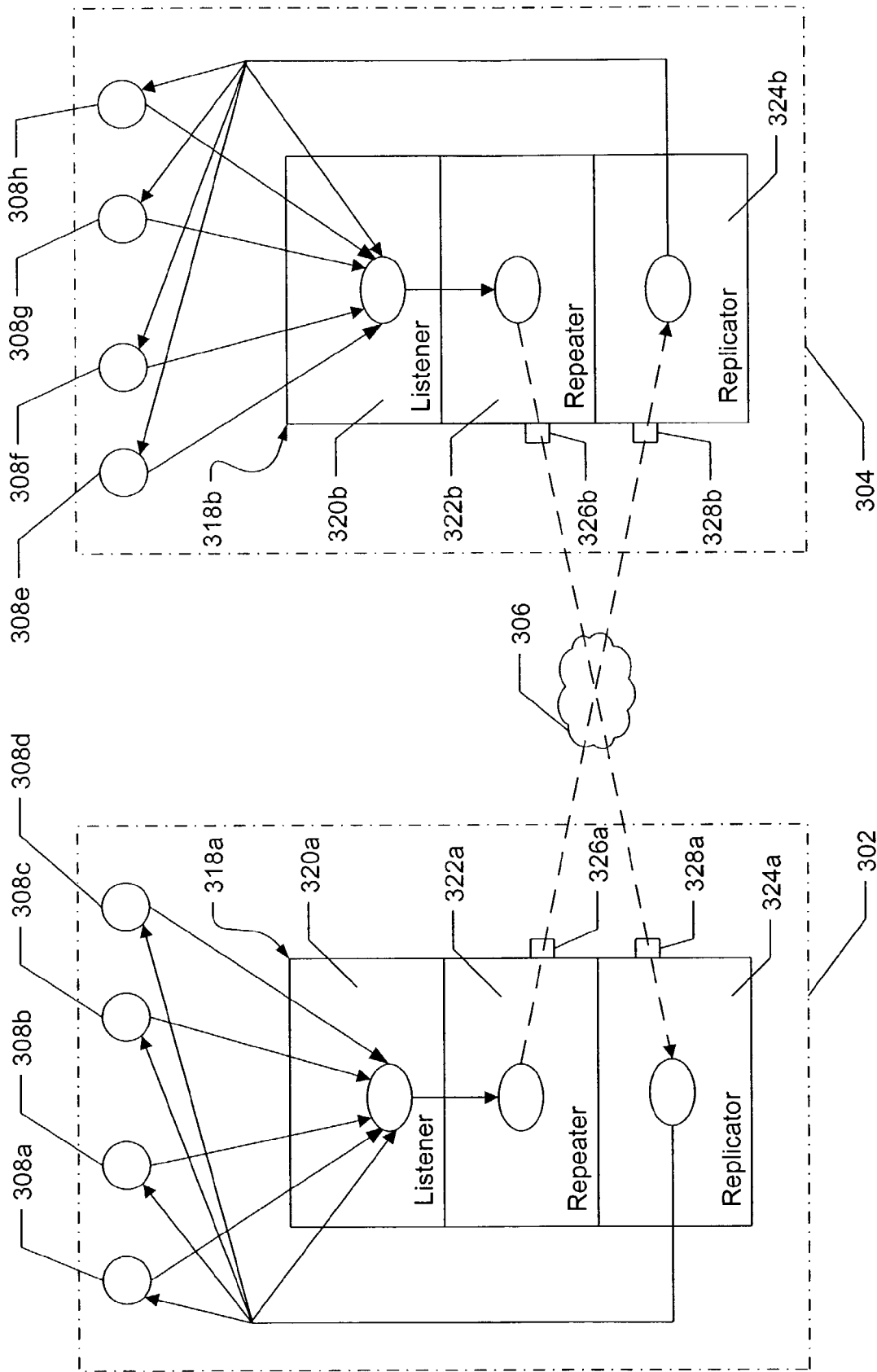
FIG. 2 illustrates a more detailed view of example bridge partners useful in systems and methods according to some examples of the invention.

Example systems and methods according to the present invention allow broadcast message data from one subnet (e.g., subnet 302) to be transferred to and broadcasted over another subnet (e.g., subnet 304). FIG. 2 diagrammatically illustrates an example of this data message transfer. As shown in FIG. 2, each subnet 302 and 304 includes a "bridge partner" 318a and 318b. In each subnet 302 and 304, this bridge partner 318a and 318b may be physically embodied in any one or more of the machines 308a-308h included in the subnet, in a servers, in the router 316a and 316b, and/or in one or more other suitable device(s) (including, but not limited to, an actual bridging device provided for this specific purpose).

Each subnet 302 and 304 includes a "listener" or receiver 320a and 320b that listens for (or receives) subnet broadcast messages. As illustrated in FIG. 2, such broadcast messages may originate, for example, from any machine 308a-h included on an individual subnet. Additional devices on the subnet, such as routers and/or bridge members, also may generate broadcast messages. Subnet broadcast messages originating on one subnet (e.g., originating in subnet 302) are not initially received by the listener (e.g., 320b) of the other subnet because these broadcast messages do not go out through the communication network 306, as described above.

When a listener 320a or 320b receives a broadcast message, systems and methods according to at least some examples of the invention may make a determination as to whether the broadcast message originated in the listener's subnet or in another subnet. If the broadcast message originated in the listener's subnet (as will be explained in more detail below), the broadcast message is then sent to a repeater 322a or 322b, which forms a portion of the bridge partner 318a or 318b. The repeater 322a or 322b (or some other suitable device or system) reformats the message (if necessary or desired) into a form suitable for transmission across the communication network 306. In some examples of the invention, the broadcast message may be reformatted from a UDP protocol to a TCP protocol for transmission over the communication network 306. Transmission across the communication network in a protocol that guarantees delivery (such as TCP) is advantageous for this leg of the communication, because it assures the guaranteed, in-order delivery of the message to the other bridge partner. Of course, any suitable protocol could be used for this transmission, including UDP, without departing from the invention. Additionally, in at least some examples of the invention, the message will be reformatted for specified delivery to the other bridging partner.

When sending a data message across a communication network 306, such as the Internet, the message typically is marked and/or encoded with data to indicate (a) its originating port and/or IP address and (b) its target or destination port and/or IP address. In the example illustrated in FIG. 2, each repeater 322a or 322b that sends data messages across the communication network 306 includes an output port 326a and 326b. These ports 326a and 326b may serve as the originating port identified as part of the data message transmitted across the communication network 306. The message may be transmitted, directed for receipt by an input port 328a or 328b (also called the "target port" or "destination port" in this specification), which in turn transmits the message to a replicator 324a or 324b, respectively, which forms part of the bridge partner in the other subnet. The replicator 324a or 324b (or some other suitable device or system) converts the incoming message to a suitable form for broadcast, if necessary (e.g., to a UDP format), and broadcasts it to all the machines on its subnet.

In this manner, subnet broadcasts on one subnet may be transmitted for broadcast on another subnet without broadcasting the message over the communication network and/or to all machines on the communication network and/or without specifying each machine for delivery. Rather, a bridge partner in one subnet merely needs to designate the message for delivery over the communication network 306 to any other desired bridge partner(s), and the message can then be transmitted to and broadcast over the subnets containing the other desired bridge partner(s).

Looking at a specific example, assume a broadcast message originates from machine 308a in subnet 302, and it is desired that this message be broadcast to machines 308b-308d on subnet 302 and machines 308e-308h on subnet 304. By originally being broadcast on subnet 302, machines 308b-308d will receive the broadcast message directly because they are located on the same subnet 302 as machine 308a. In addition, listener 320a also will receive the broadcast message. Noting that this message originated within subnet 302 (and/or noting that this message was not received from the communication network 306 or from another subnet or from replicator 324a), listener 320a will send the message to repeater 322a for transmission out of port 326a, over the communication network 306, through input port 328b of replicator 324b of subnet 304. The replicator 324b will then broadcast the message to machines 308e-308h. If necessary, format changes to the message data may occur at appropriate times to allow transmission over the communication network 306 and/or broadcast over the second subnet 304. Broadcast messages originating on subnet 304 can be transmitted for broadcast in subnet 302 by a similar procedure, as is evident from FIG. 2.

In this example, when a data message is broadcast on subnet 304 (after transmission through the communication network 306 from subnet 302), the broadcast message will then be heard by listener 320b in subnet 304. If this data message were then sent back to subnet 302 through repeater 322b, this same message would endlessly bounce back and forth between subnets 302 and 304, resulting in a continuous loop of data message communications. Therefore, in accordance with at least some aspects of the invention, data messages may be "marked" to prevent retransmission back to their originating subnet and/or to prevent rebroadcast on their originating subnet. For example, prior to broadcasting the data message over subnet 304, the replicator 324b may mark the message to indicate that the message came from the replicator 324b (e.g., by including bits with the message indicating that it originated from and/or passed through repeater 322a, repeater port 326a, replicator port 328b, and/or the replicator 324b). As noted above, data messages typically are marked to include their originating port and destination port. Then when listener 320b receives a broadcast message, by looking at the originating port data or the like, the listener 320b can easily determine whether this broadcast message originated on its own subnet 304 or on another subnet, such as subnet 302. If the message originated from a machine 308e-308h on its own subnet 304, the listener 320b can send the message to the repeater 322b for transmission to the other subnet 302. However, if the message originated from or passed through the repeater 322a or replicator 324b (or one of their ports), the listener 320b will know that this data message originated in subnet 302 and should not be sent back to that subnet 302.

Various ways of marking and/or otherwise determining the origin of a data message may be used without departing from the invention. As an example, in addition to using the port identifiers described above, the message could be marked with the IP address of the machine or device from which the message originated and/or machines and/or devices through which the message passes during transmission, and the listeners (or other systems) could use this information to determine whether or not to transmit the message to another subnet. As another example, flags could be set once a message has been transmitted across the communication network, and the listeners or other systems could look for these flags. Various other marking methods may be used without departing from the invention.

While FIG. 2 illustrates the listener 320a, repeater 322a, and replicator 324a as separate portions of the bridge partner 318a, this is for a matter of convenience to differentiate various example functions of the bridge partner 318a. These functions can be accomplished in any suitable manner on any desired number of machines on a subnet without departing from the invention. For example, all functions could be performed by a single machine or device on the subnet, including, for example, a machine or device dedicated to the bridging function. As another example, all functions could be performed by either the router 316a or a server in the subnet, or the functions could be shared between these devices. As still another example, one or more of the machines 308a-308d involved in the communication could be used for one or more of the functions of bridge partner 318a. Those skilled in the art will appreciate that a wide variety of ways of performing these various functions could be provided within a subnet without departing from the invention.

In addition, while the above description indicates that various elements in the bridge members perform various functions (e.g., the replicator adding a marking to the message or the listener checking for a marking), these are merely examples. The invention is not limited to situations where certain devices must perform certain functions. Rather, any suitable arrangement and/or distribution of the functions in the bridge members and/or subnets may be used without departing from the invention. For example, if desired, a repeater or a listener or another device or system could be used to provide the marking, and/or a repeater or a replicator or another device or system could be used to check for a marking, without departing from the invention. The above description merely provides examples of suitable systems and methods for performing various functions in bridging systems and methods according to this invention.

Figure 3:
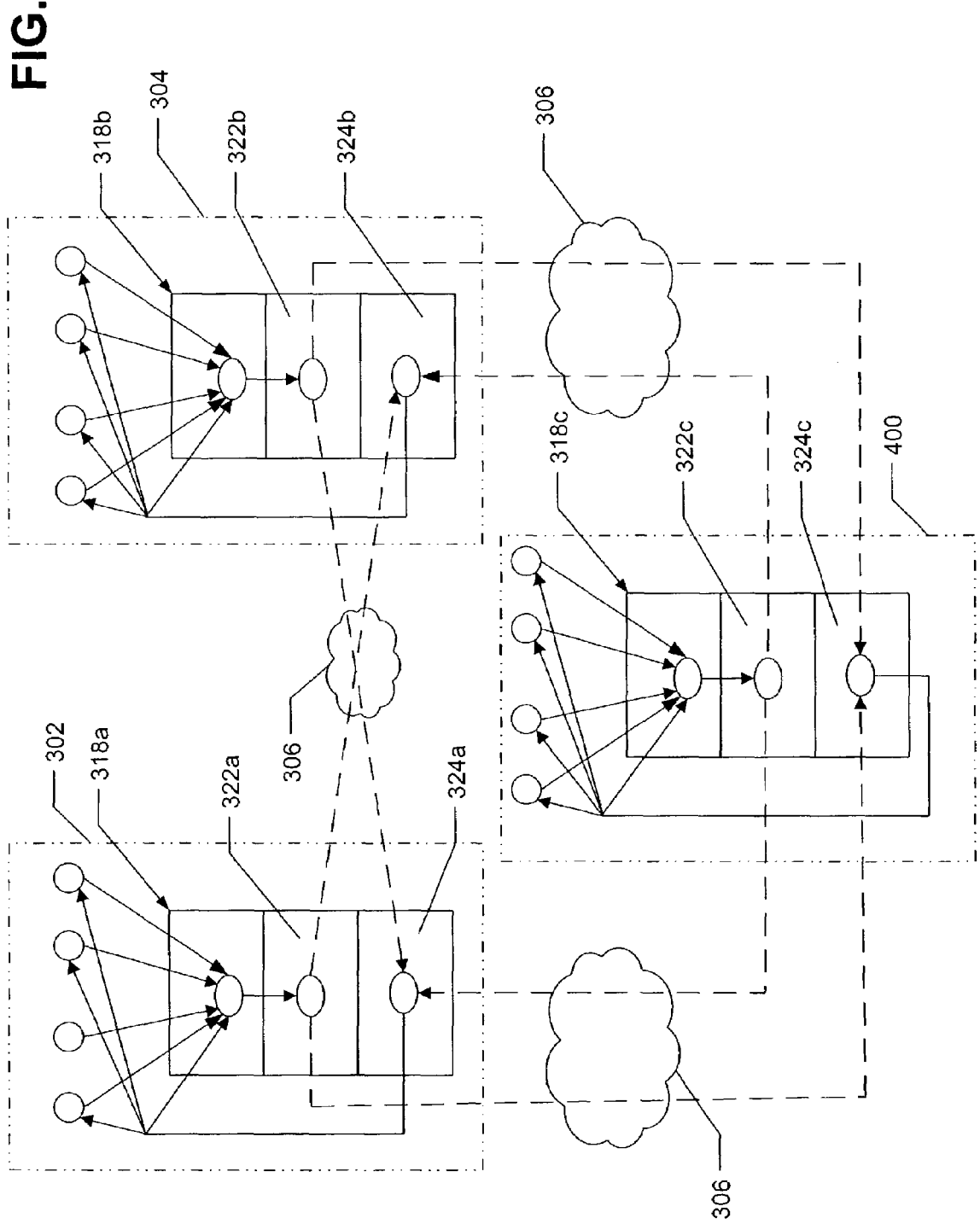
FIGS. 3 and 4 illustrate examples of three subnets in communication with one another over one or more communication networks, as may be used in systems and methods according to some examples of the invention.

Additionally, the present invention is not limited to communications between two subnets, as illustrated in FIG. 2. Rather, if desired, three or more subnets can be connected with bridging partners in the manner described in connection with FIG. 2. FIG. 3 generally illustrates an example of three subnets 302, 304, and 400 connected in parallel via bridging members 318a, 318b, and 318c. By "connected in parallel," in this context, means that each bridging member 318a, 318b, and 318c sends messages from its repeater 322a, 322b, and 322c to the replicators 324a, 324b, and 324c on all of the other subnets, as shown by the arrows exiting each repeater 322a, 322b, and 322c in FIG. 3. Likewise, in the illustrated example of FIG. 3, each replicator 324a, 324b, and 324c is capable of receiving messages from the repeaters 322a, 322b, and 322c of the other subnets (as indicated by the arrows coming into replicators 324a, 324b, and 324c). The communication system(s) 306 through which the data messages travel between the subnets may be the same or different, without departing from the invention. Any desired number of subnets may be connected together in this parallel manner without departing from the invention.

Figure 4:
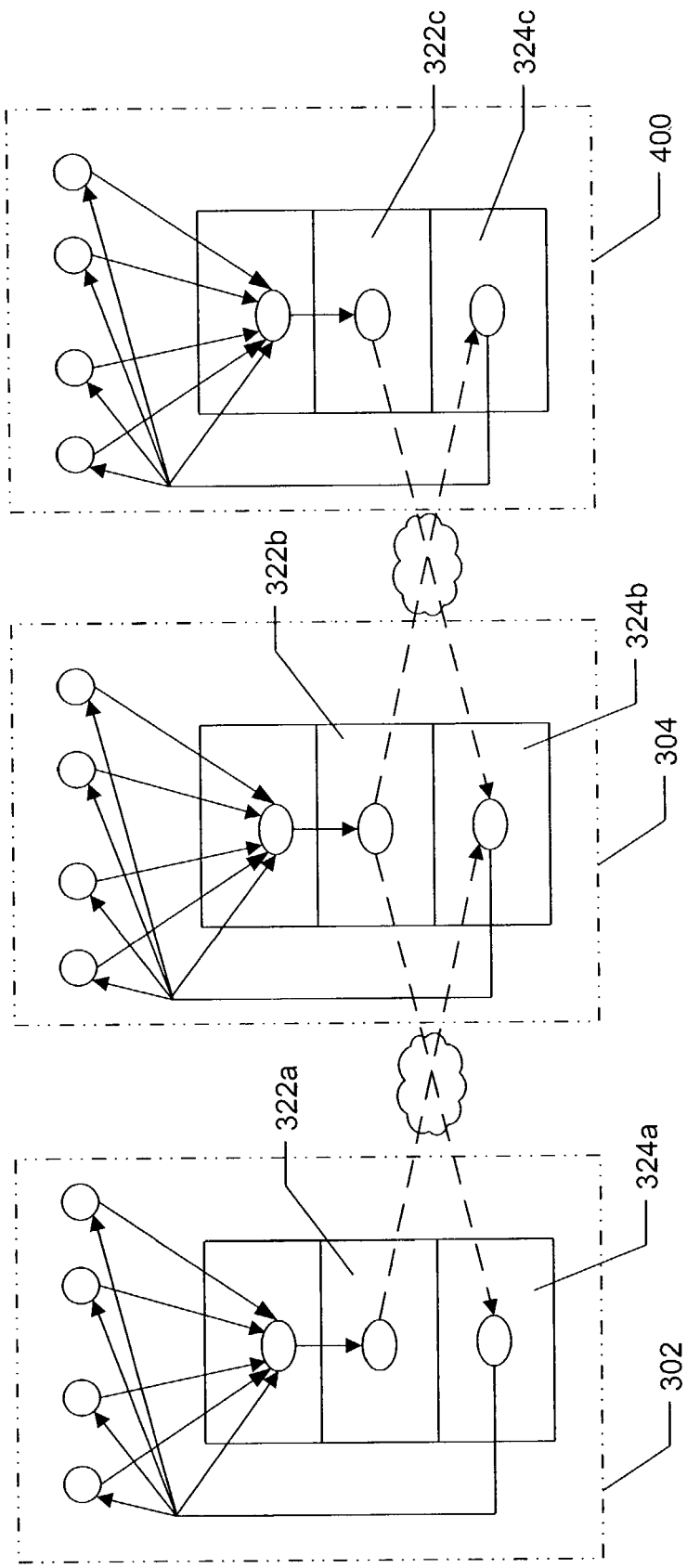

FIG. 4 illustrates another example of multiple subnets connected together for bridging communications in accordance with some examples of this invention. FIG. 4 illustrates a "series" type connection, wherein one subnet 304 acts as a bridge between two other subnets 302 and 400. In this example, the replicator 324b of subnet 304 receives input messages from the repeaters 322a and 322c of subnets 302 and 400, respectively. Additionally, the repeater 322b of subnet 304 sends broadcast messages to the replicators 324a and 324c of subnets 302 and 400, respectively. A message originating in subnet 302 is transmitted to subnet 304, and subnet 304 then transmits this same message to subnet 400. In a similar manner, a message originating in subnet 400 is transmitted to subnet 302 via subnet 304. Subnets 302 and 400 communicate only with subnet 304, and subnet 304 is capable of communicating with both subnets 302 and 400. Any desired number of subnets may be connected together in this series manner without departing from the invention.

Other subnet interconnection methods may be used without departing from the invention, including combinations of the parallel and series type connections discussed above. Additionally, it is not a requirement that each subnet have the same connection arrangements as all other subnets. Many variations in the subnet connections can be used without departing from this invention.

Figure 5:
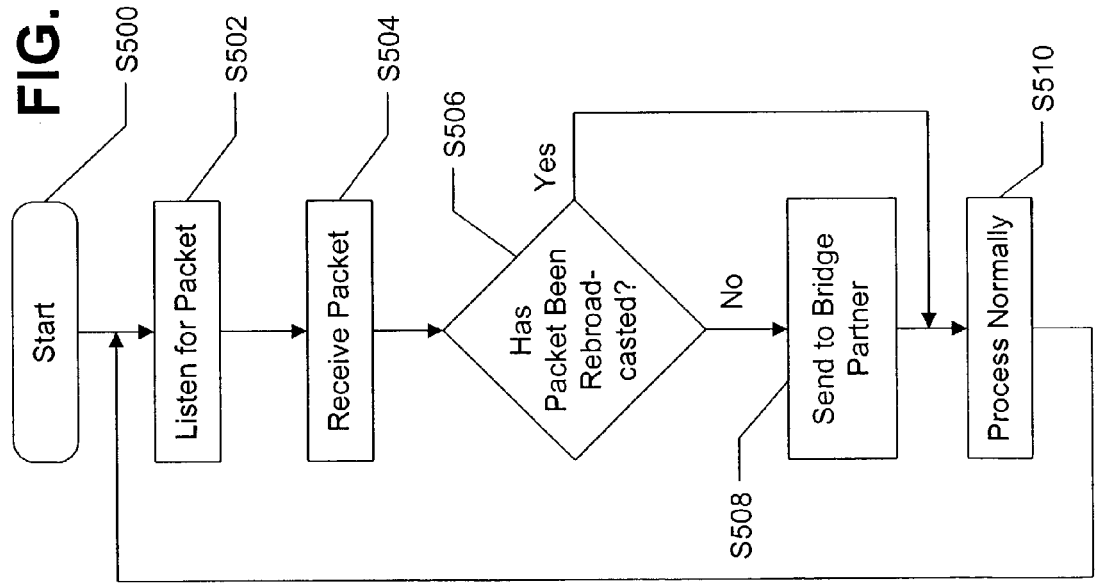

FIGS. 5-8 include flow diagrams describing various example methods useful in the present invention. FIG. 5 illustrates an example procedure that may be performed by a listener or receiver 320a and/or a repeater 322a of one bridge partner 318a (or another appropriate device or combination of devices) in at least some examples of the invention. After the procedure starts (S500), the listener listens for broadcast message data (a "packet") (S502). When a broadcast message is received (S504), systems and methods according to at least some examples of the invention determine whether the packet of message data originated within the subnet where it was received or if it originated in another subnet (S506) (if broadcast message data originated in a different subnet, when this data is then transferred to and broadcast again (e.g., on other subnets), this is considered a "rebroadcast" of the message data, for purposes of the present specification). As described above, message data can be marked in various different ways so that systems and methods according to examples of the invention can determine the subnet where the message data originated (or they can at least determine whether the message originated within the subnet at which it was detected). Using marking techniques like those described above, systems and methods according to at least some examples of the invention also can decide which broadcast messages originating on a given subnet will be transmitted over the communication network (i.e., it may not be desired to transmit every broadcast message on a subnet to the other subnet(s)).

If it is determined at S506 that the message is not a rebroadcasted message (i.e., the broadcast message data originated in the subnet where it was received—answer "No"), the message data then is sent to the other subnet(s) (S508). As described above, in some example systems and methods of the invention, this broadcast message may be converted from one protocol to another (e.g., UDP to TCP) for transmission over the communication network to a specified machine or device (e.g., to the other "bridge partner"). If, however, it is determined at S506 that the message has been rebroadcasted on the subnet where it was received (answer "Yes"), the message data is not sent to the bridge partner (S508 is skipped). Then, in either instance, normal processing of the message occurs (S510), if any, and the systems and methods according to this example of the invention return to the beginning S502 and listen for the next broadcast message data.

Figure 6:
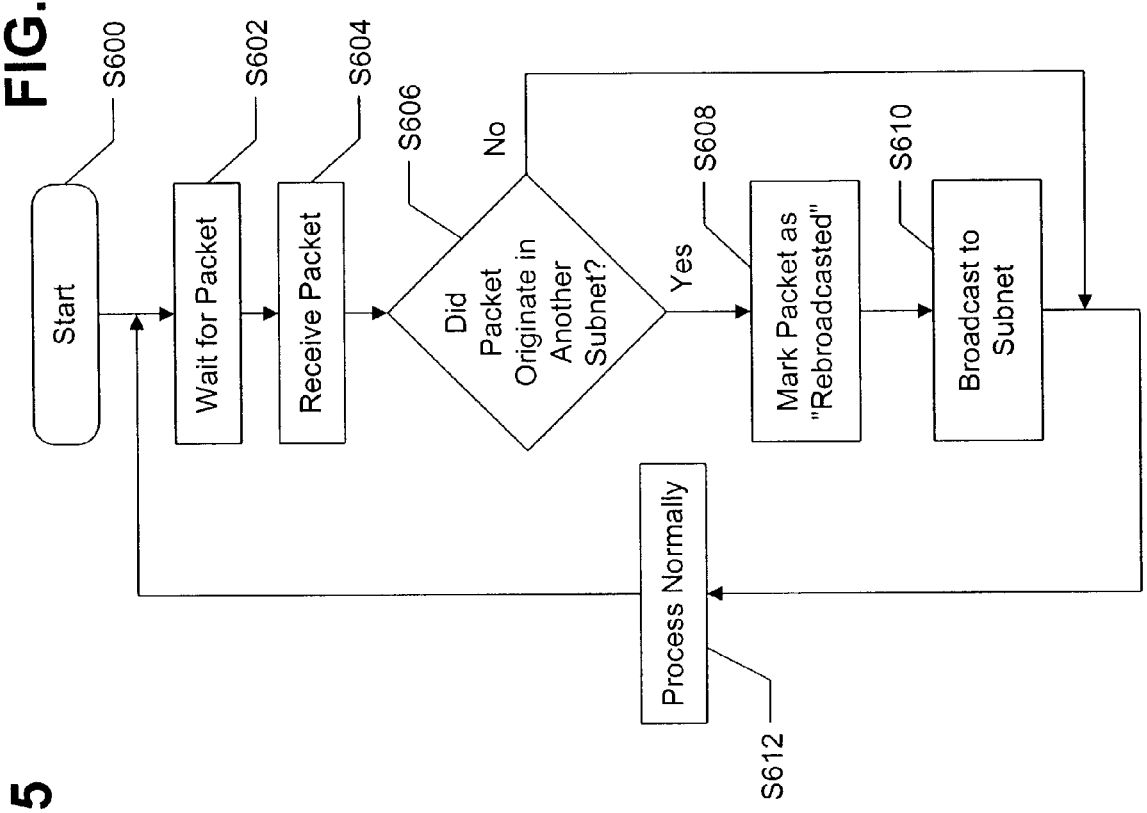
FIGS. 5 and 6 illustrate methods and/or processing conducted by bridge partners used in some examples of systems and methods according to the invention.

FIG. 6 illustrates an example of processing that may occur at the opposite side of bridge systems or methods according to at least some examples of this invention when a data message is sent across the bridge. As the process starts (S600), a replicator (e.g., 324a or 324b) or other appropriate device waits to receive a data message from another subnet (S602). Once a packet is received (S604), systems and methods according to this example of the invention determine whether this packet originated in another subnet (S606). If "Yes," the packet may be marked as containing "rebroadcasted" data (in any of the various manners described above) (S608), reconfigured for broadcast on this subnet (if necessary), and broadcast to users of the subnet (S610). If the packet originated on the subnet where it was detected (answer "No" at S606), it is not marked as rebroadcasted (S608 and S610 are skipped). This packet will then be transmitted to other subnets (e.g., when detected by the listener as described in conjunction with FIG. 5). After determining whether the packet has been rebroadcasted, systems and methods according to this example of the invention then process the packet in a normal or conventional manner (S612), and return to wait for the next data packet (return to S602). If all transmissions across the communication network enter the receiving subnet at a common location (such as a replicator 324a), S606 may be omitted (i.e., all packets coming in through this route should be marked "rebroadcast").

Figure 8:
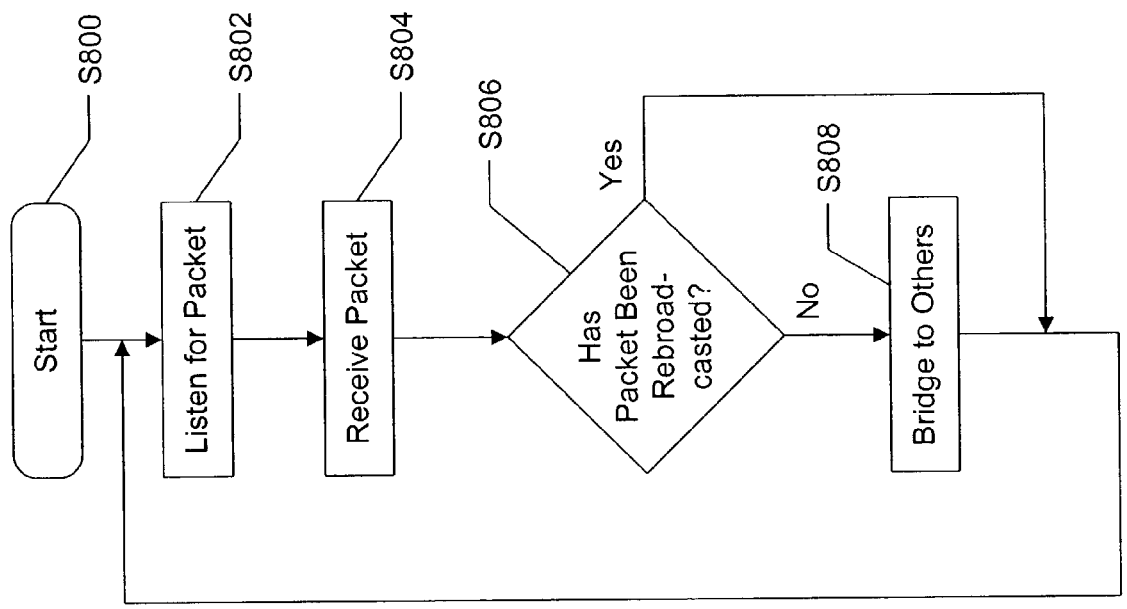
FIG. 8 illustrates methods and/or processing conducted at the subnet bridge level in some examples of systems and methods according to the invention.
Figure 7:
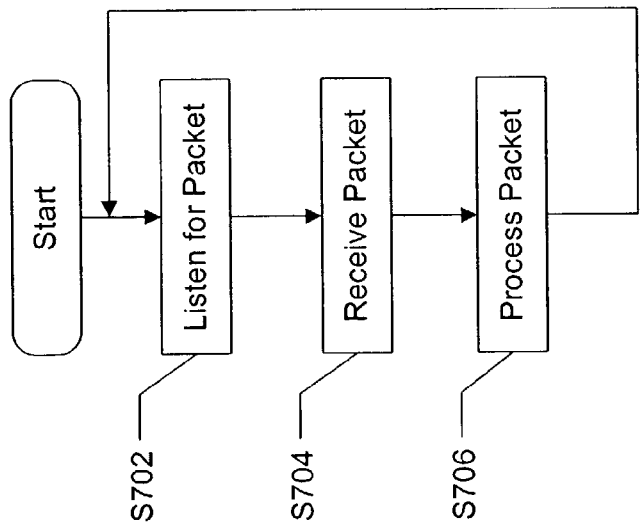
FIG. 7 illustrates methods and/or processing conducted at the application program level in some examples of systems and methods according to the invention.

FIGS. 7 and 8 generally illustrate different functions performed at the application program level (FIG. 7) and at the subnet bridge level (FIG. 8), as message data packets are received in at least some examples of the invention. As shown in FIG. 7, at the application program level, the program listens for a packet (S702), and when a packet is received (S704), it is processed in a normal manner (S706). Accordingly, in at least some examples of the invention, the fact that a broadcast message may have originated on another subnet (and come across on a bridge) is transparent to the application program. While systems and methods in accordance with some examples of the invention may include processing at the application program level that relates to the use of the bridging systems and methods according to the invention (e.g., including, but not limited to marking, detecting markings, reformatting data messages, etc., as described above), it is not necessary that the application programs do any such processing, at least in some examples of the invention. Rather, in at least some examples of the invention, all processing may take place at the subnet bridge level.

FIG. 8 generally illustrates an example of processing that may take place at the subnet bridge level, in at least some examples of the invention. In this illustrated example, once processing starts (S800), the bridge listens for broadcast message data packets (S802). When a packet is received (S804), a determination is made as to whether this data packet originated from the subnet of the bridge partner's location (e.g., by determining if the data packet was "rebroadcasted" in the subnet—S806). If the packet has not previously been broadcast on other subnet(s) (answer "No"), the data packet is bridged to other subnet(s) involved in the communication (S808). If "Yes" at S806 (the packet contained "rebroadcast" data), the data packet is not sent to the other subnets. The subnet bridge then waits for the next data packet (return to S802).

Of course, FIGS. 5-8 merely illustrate examples of possible methods useful in various aspects of the present invention. Various changes from the procedures described in FIGS. 5-8 may take place without departing from the invention, including the addition of steps, the omission of various described steps, and modification to the described steps.

Additionally, the methods described in connection with FIGS. 5-8 are not limited for use with any specific hardware or software system, although these methods may be used in connection with the example systems illustrated in FIGS. 1-4.

IV. Example Hardware

Figure 9:
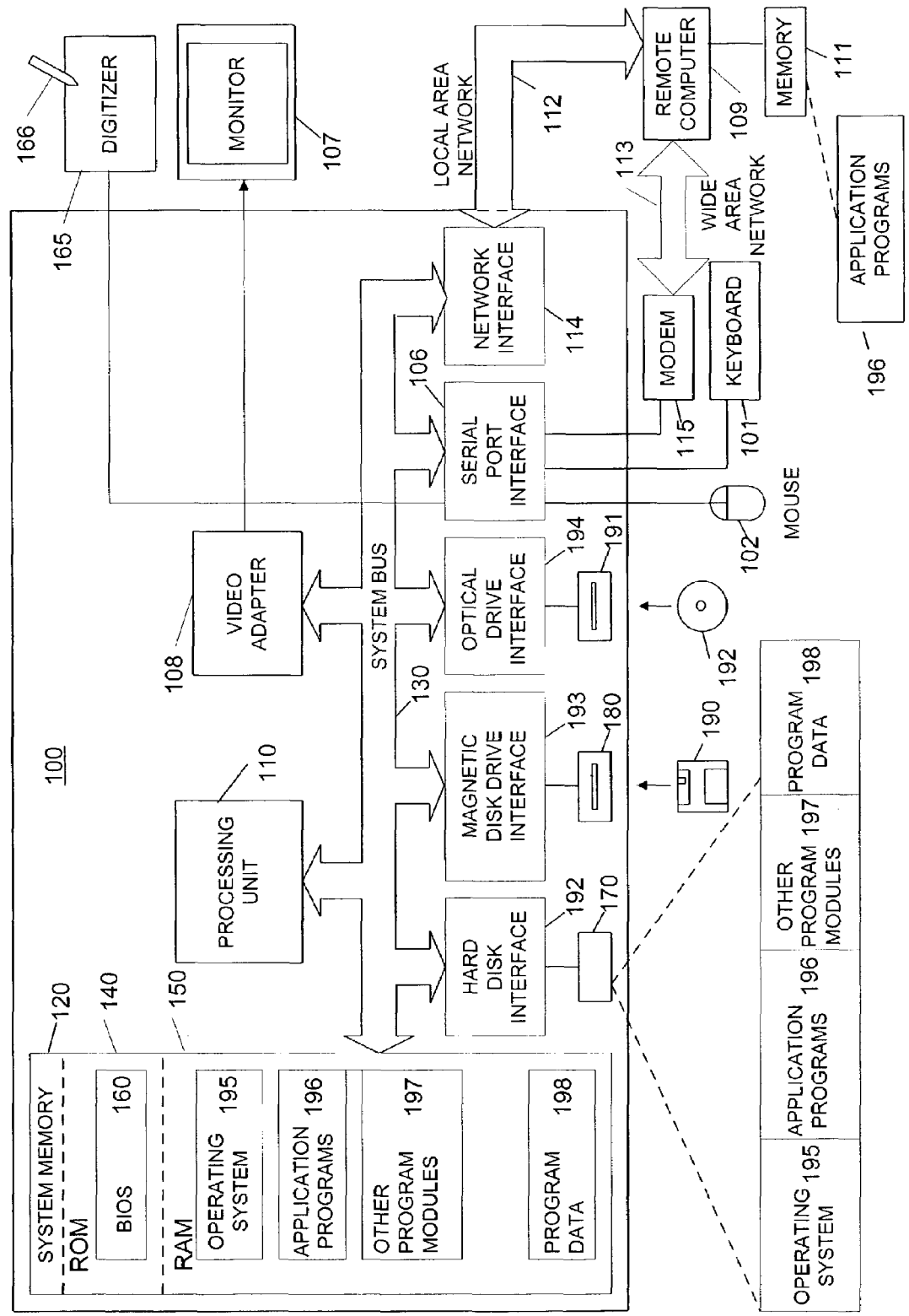
FIG. 9 illustrates a schematic diagram of a general-purpose digital computing environment in which certain aspects of the present invention may be implemented.

FIG. 9 illustrates a schematic diagram of a general-purpose digital computing environment that can be used to implement various aspects of the present invention, including, but not limited to, acting as all or a part of a bridging partner 318a and/or a machine 308a-308h. In FIG. 9, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 9, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 9, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although only a memory storage device 111 has been illustrated in FIG. 9. The logical connections depicted in FIG. 9 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a client-server configuration to permit a user to retrieve web pages from a web-based server. Any of various conventional web browsers can be used to display and manipulate data on web pages.

Although the FIG. 9 environment shows an exemplary environment, it will be understood that other computing environments may also be used. For example, one or more examples of the present invention may use an environment having fewer than all of the various aspects shown in FIG. 9 and described above, and these aspects may appear in various combinations and subcombinations that will be apparent to one of ordinary skill.

Figure 10:
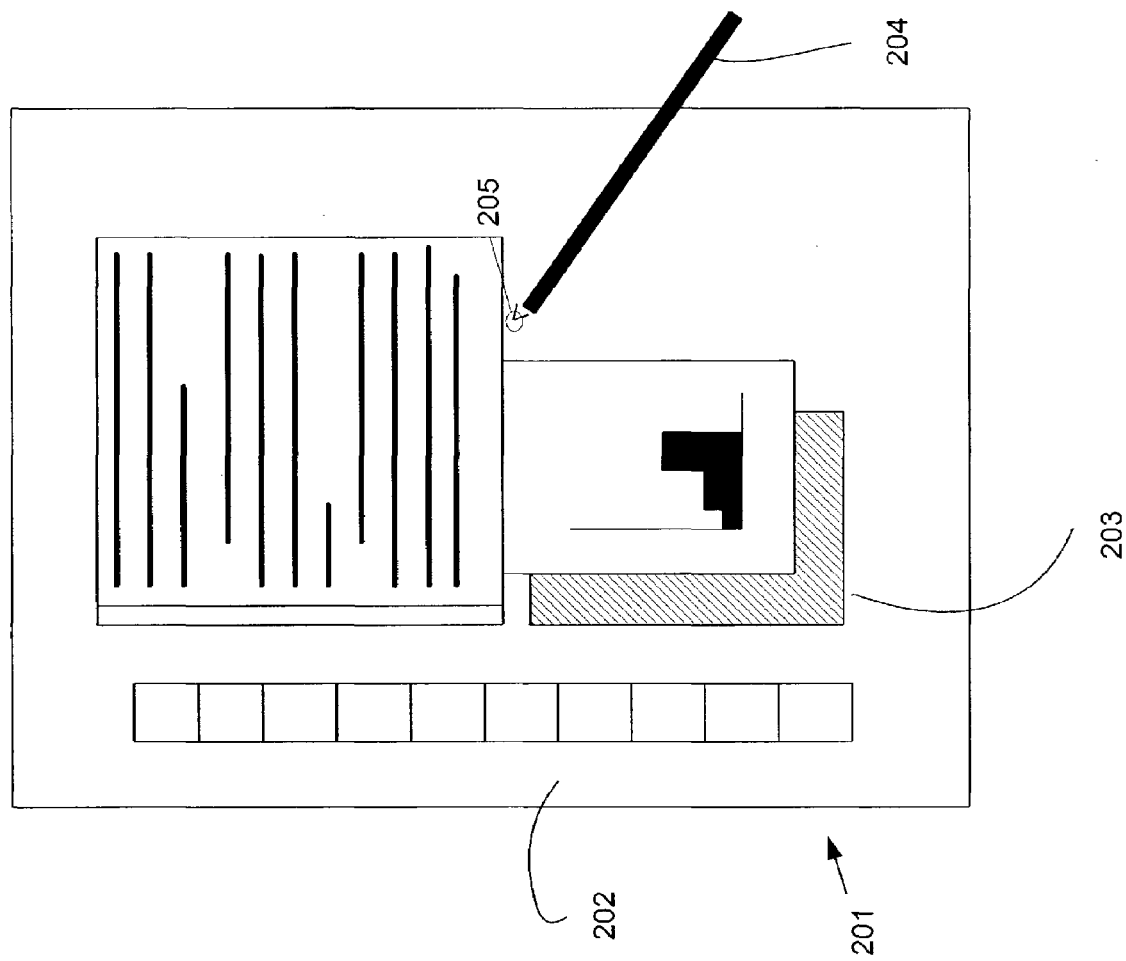
FIG. 10 illustrates a pen-based personal computing (PC) environment in which certain aspects of the present invention may be implemented.

FIG. 10 illustrates a pen-based personal computer (PC) 201 that can be used in accordance with various aspects of the present invention. Any or all of the features, subsystems, and functions in the system of FIG. 9 can be included in the computer of FIG. 10. The pen-based personal computer system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

V. Conclusion

Bridging systems and methods according to various aspects of this invention can be used for any communications in which users wish to send and receive broadcast messages across more than one subnet. For example, a group of users on two or more subnets may wish to communicate using broadcast messages, so that multiple users will be free to enter and leave the communication group without adversely affecting the communications. Example systems in which bridging systems and methods according to examples of this invention may be used may include collaborative communication sessions, such as electronic whiteboard sessions or other collaborative applications that allow users at different workstations to concurrently share electronic data and information and all simultaneously view the same information, make changes in real time, and view the changed information (e.g., NetMeeting® sessions ("NetMeeting" is a registered trademark of Microsoft Corporation of Redmond, Wash.) and/or WebEx® sessions ("WebEx®" is a registered trademark of WebEx Communication Inc. of San Jose, Calif.)).

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A system for bridging subnet broadcasts across subnet boundaries, comprising:
   a receiver configured to receive a first broadcast message, the first broadcast message originating in a first subnet and being marked to indicate that it originated in the first subnet to prevent rebroadcast of the first broadcast message on the first subnet;
   a repeater configured to send the first broadcast message to a second subnet; and
   a replicator configured to broadcast a second broadcast message on the first subnet, the second broadcast message originating from a subnet other than the first subnet, at least one of the broadcast messages being a UDP broadcast message.

2. A system according to claim 1, further comprising:
   a port for receiving the second broadcast message.

3. A system according to claim 1, the second broadcast message originating from the second subnet.

4. A bridging system for bridging subnet broadcasts between a first subnet and a second subnet, comprising:
   a first receiver configured to receive a first broadcast message that originates in the first subnet, the first broadcast message being marked to indicate it originated in the first subnet to prevent rebroadcast of the first broadcast message on the first subnet;
   a second receiver configured to receive a second broadcast message that originates in the second subnet, the second broadcast message being marked to indicate it originated in the second subnet to prevent rebroadcast of the second broadcast message on second subnet;
   a first repeater configured to send the first broadcast message to the second subnet;
   a second repeater configured to send the second broadcast message to the first subnet;
   a first replicator configured to broadcast the second broadcast message on the first subnet; and
   a second replicator configured to broadcast the first broadcast message on the second subnet, at least one of the first broadcast message and the second broadcast message being a UDP broadcast message.

5. A bridging system according to claim 4, further including:
   a first port for receiving the second broadcast message; and
   a second port for receiving the first broadcast message.

6. A bridging system according to claim 4, the first receiver, the first repeater, and the first replicator forming a first bridge member, and the second receiver, the second repeater, and the second replicator forming a second bridge member in communication with the first bridge member.

7. The bridging system of claim 4, the first and second broadcast messages being marked with an originating port and a destination port.

8. The bridging system of claim 4, the first repeater being further configured to reformat the first broadcast message and the second repeater being further configured to reformat the second broadcast message.

9. A method for bridging subnet broadcasts across subnet boundaries, comprising:
   receiving a first UDP broadcast message that originates in a first subnet;
   sending the first UDP broadcast message to a second subnet; and
   broadcasting the first UDP broadcast message within the second subnet, the first UDP broadcast message being marked to indicate that it did not originate within the second subnet, the first UDP broadcast message being processed in at least one manner selected from the group of:
   preventing the first broadcast message from being sent from the second subnet back to the first subnet, or
   preventing the first broadcast message from being rebroadcast within the first subnet.

10. A method according to claim 9, further comprising:
    sending the first UDP broadcast message to a third subnet; and
    broadcasting the first UDP broadcast message within the third subnet, the first UDP broadcast message being processed in at least one manner selected from the group of:
    not sending the first UDP broadcast message from the third subnet back to the first subnet, or
    not rebroadcasting the first UDP broadcast message within the first subnet.

11. A method according to claim 10, the first UDP broadcast message being sent to the third subnet from the first subnet.

12. A method according to claim 10, the first UDP broadcast message being sent to the third subnet from the second subnet.

13. A method according to claim 10, marking the first broadcast message to indicate that it did not originate within the third subnet when the first broadcast message is broadcasted within the third subnet.

14. A method for bridging subnet broadcasts across subnet boundaries, comprising:
   receiving a first broadcast message that originates in a first subnet, the first broadcast message being marked to indicate that it originated from the first subnet;
   receiving a second broadcast message that originates in a second subnet, the second broadcast message being marked to indicate that it originated from the second subnet, using a UDP protocol to send at least one of the first broadcast message and the second broadcast message;
   sending the first broadcast message to the second subnet;
   sending the second broadcast message to the first subnet;
   broadcasting the first broadcast message on the second subnet, the first broadcast message being prevented from being sent from the second subnet back to the first subnet and preventing the first broadcast message from being rebroadcast on the first subnet; and
   broadcasting the second broadcast message on the first subnet, the second broadcast message being prevented from being sent from the first subnet back to the second subnet and preventing the second broadcast message from being rebroadcast on the second subnet.

15. A method of processing broadcast messages, comprising:
   receiving a first UDP broadcast message on a first subnet;
   determining whether the first UDP broadcast message originated in the first subnet; and
   when the first UDP broadcast message originated in the first subnet, sending the first UDP broadcast message to a second subnet and preventing the first UDP broadcast message from being rebroadcast on the first subnet,
   receiving a second broadcast message on the second subnet;
   determining whether the second broadcast message originated in the second subnet; and
   when the second broadcast message originated in the second subnet, sending the second broadcast message to the first subnet, using UDP methods to send at least one of the first broadcast message and the second broadcast message.

16. A method according to claim 15, the first broadcast message being sent to a predetermined port in the second subnet.

17. A method according to claim 16, further comprising:
   broadcasting the first broadcast message over the second subnet.

18. A method according to claim 15, further comprising:
   broadcasting the first broadcast message over the second subnet.

19. A method according to claim 15, the second broadcast message being sent to a predetermined port in the first subnet.

20. A method according to claim 15, further comprising:
   broadcasting the second broadcast message over the first subnet.

21. A method according to claim 15, determining whether the first broadcast message originated in the first subnet including determining at least one of an originating IP address or an originating port number of the received first broadcast message.

22. A method according to claim 21, determining whether the second broadcast message originated in the second subnet including determining at least one of an originating IP address or an originating port number of the received second broadcast message.

23. A method according to claim 15, determining whether the second broadcast message originated in the second subnet including determining at least one of an originating IP address or an originating port number of the received second broadcast message.

24. A method according to claim 15, determining whether the first broadcast message originated in the first subnet including determining at least one of an originating IP address or an originating port number of the received first broadcast message.

* * * * *